Oct. 28, 1958

M. TAUBE 2,858,073

CODED RECORD CARD

Filed March 18, 1957

INVENTOR:
M. TAUBE,

BY Homer R. Montague
ATTORNEY

United States Patent Office 2,858,073

Patented Oct. 28, 1958

2,858,073

CODED RECORD CARD

Mortimer Taube, Washington, D. C.

Application March 18, 1957, Serial No. 646,590

2 Claims. (Cl. 235—61.12)

This invention pertains to punched card control systems, and especially to a novel form of punched card device for the control of tabulating, calculating and printing or typing machinery and similar devices.

In the well-known Hollerith or punched card form of control system, the basic data forming the material to be processed are stored or recorded in individual cards, each being punched with one form or another of the punch codes for the designation and automatic read-out of numerical or alphabetic information. As compared to lengthy tapes or other long storage or recording media, the card form provides important advantages including ease of locating, sorting, duplicating and rearranging the information. Elaborate machinery for the handling and utilization of such cards has come into wide use especially in accounting, statistical and other fields involving data storage and tabulating or computation.

A second form of relatively permanent information storage, and one which is equally familiar in the communications field, is the Creed or Kleinschmidt tape, which is normally punched in repeated rows transverse to the tape direction, each row comprising a few bits of information. Originally designed for the field of the printing telegraph, such tape has relatively recently come into use for control of high speed typing or printing equipment for general business use. A good example of such a system is given in the U. S. Patents to Blodgett, Nos. 2,700,421 and 2,700,445 to '447.

For many applications, it would desirable if the same or related data were capable of being encoded in both forms on a single record unit or card. Thus, by utilizing different areas or regions on a single card, the basic information could be stored in such form that the card could be used to feed the desired information into the diverse types of interpreting machinery for use in the various known ways, either at will in accordance with particular equipment available at an installation, or selectively for particular purposes.

One difficulty stands in the way of the above improvement. The aim of the manufacturer of punched card systems and equipment is to utilize the storage capabilities of the punched card to their maximum. Hence the standard size of card unit, for which all of the complex handling equipment is designed, leaves little room for any supplemental coding or punching.

It is accordingly a principal object of this invention to provide a punched record card having information punched therein in a plurality of punch-codes whereby one such card may be employed as a control record for any of a plurality of read-out devices having differing punch-code characteristics.

Another object of the invention is to provide a punched record card having discrete areas wherein each of said areas on a given card contains information the same as or related to that of the other area or areas but in a different punch-code.

A more specific object of the invention is to provide a rectangular punched record card which is divided longitudinally into two areas of approximately equal width, one of said areas being punched according to a permutation code for multi-column scan in a direction perpendicular to the length of the card, and the other area being punched according to a permutation code for multi-row scan in a direction parallel to the length of the card, wherein the information punched into the second area may be the same as or related to the information punched into the first area.

With the above and other objects and advantages of this invention in mind, a preferred embodiment thereof will now be described in the following detailed specification, taken in connection with the appended drawings, in which.

Figure 1:
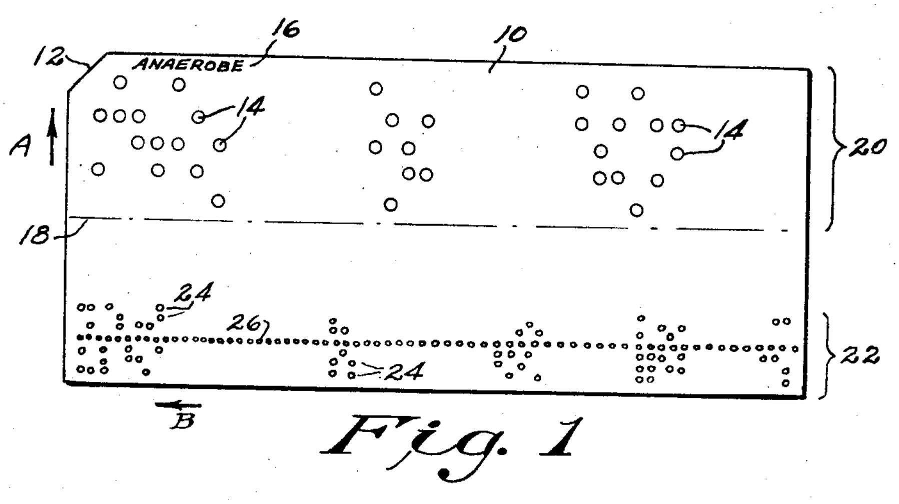
Fig. 1 is a plan view of a preferred form of the record card of this invention.

The record card 10 of Fig. 1 is of a rectangular shape as is usual in the art of punched cards. As with most such cards, a corner at 12 is cut away to provide for ease in proper orientation of the cards when they are to be stacked in preparation for their use as control records for tabulating machines or the like. Information that is to be recorded on such cards is represented in the form of a plurality of punched holes, as at 14 in Fig. 1, the holes being punched in accordance with a predetermined time-serial punch-code (for each column) in such manner that the positional permutations of the holes punched in each such vertical column are characteristic of a particular bit of information; e. g., a numeral, a letter of the alphabet or the like. In many applications, the information that is coded or punched into the card is also printed in text near the top of the card, as indicated at 16 in Fig. 1. In reading or interpreting the punch code the card moves in the direction of arrow A in Fig. 1.

Designers and manufacturers of punched tabulating machine cards and systems have, for obvious reasons, attempted to provide systems in which a maximum storage of information can be obtained on a card whose dimensions are reasonably adapted to both manual and machine handling. Thus, a common form of card provides both columns and rows of possible single code punch positions, substantially filling the card area; for example, 80 columns of ten rows. To record all possible or useful combinations of characters, such cards must be free of any interfering codes, and hence such a card does not permit the addition of a different set of codes. However, at least one other known type of card utilizes only half of the card area, the coding being done by a position permutation system in which one, two or even three punches are selected, out of a possible total of five punch positions, the five possible positions requiring only half the card width. Such cards are usually re-used on the second half of the card, to utilize the full area available. However, this use of a code system requiring only half the card area for a complete encoding, does permit the remaining half of the card to be devoted to the additional coding required by the present invention.

In the present invention, advantage is taken of the space-saving character of the limited punch-code area 20 illustrated in Fig. 1 in order to permit the provision of an additional code 22 of different characteristics on the lower half of the card. The code 22 is a time parallel code of the type used in Creed or Kleinschmidt tape. As is well known, the time axis extends in the direction of the length of the code area 22, and the information to be recorded is punched in as at information holes 24. In the code as illustrated in Fig. 1, there are six possible positions for information holes 24 transverse to the control row of feed holes 26. The feed holes 26, when engaged by a drive sprocket, serve to advance the card 10 in the direction of arrow B so that the time serial code 22 may be read out. Seven, eight or even more punch positions may obviously be used for more elaborate coding schemes.

Figure 2:
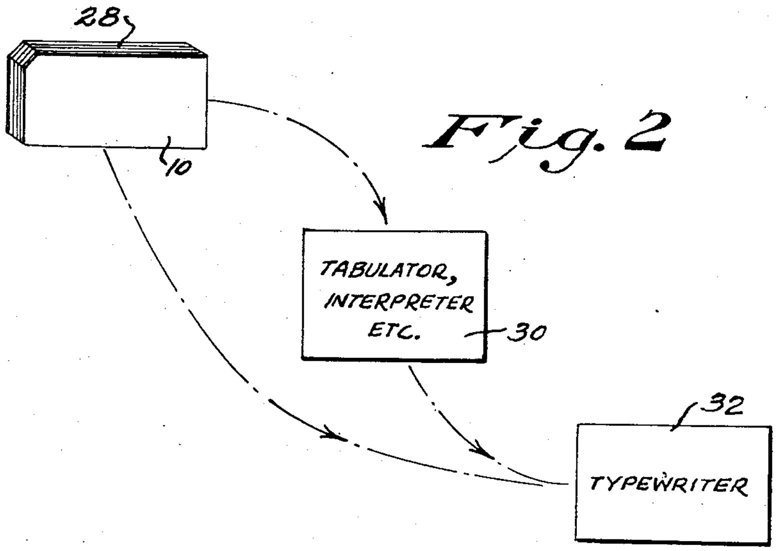
Fig. 2 is a flow diagram illustrating uses of the record card of the invention.

The advantages of providing a record card with more than one punch-code thereon are obvious from a consideration of Fig. 2. The box labelled 30 represents a calculating or tabulating machine or the like which is responsive to a punch-code of the type shown at 20 in Fig. 1, while the machine represented at 32 may be another calculator, tabulator or the like or especially an automatic typing or printing machine of the Blodgett type which is responsive to the punch-code illustrated at 22 in Fig. 1. As indicated by the arrows in Fig. 2, the cards 10 in stack 28 may be inserted in the reading device of the machine 30 in order to perform an interpretation, a tabulation or similar operation in accordance with the information contained in the code 20. If the information contained in code 22 is the same as that of code 20, the same tabulation or similar operation could of course be performed by the machine 32 in response to the code 22. In this manner, a single card is provided which will control either machine in accordance with the recorded information.

Alternatively, if the machine 32 is an automatic typewriter such as described in the Blodgett patents, and the information recorded in code 22 is different from but related to the information in code 20, as for example a tabulation for billing purposes in code 20 and the name and address of the debtor in code 22, the cards may first be employed to run the tabulation in machine 30, and then be inserted in machine 32 for addressing envelopes in which the tabulations are to be mailed.

It will thus be seen that the present invention provides a punched record card carrying one or more messages or pieces of information recorded in a plurality of punch-codes, thus enabling the same card to serve as a control record for automatic machines of differing punch-code characteristics.

What is claimed is:

1. A composite code punched card of rectangular shape, the area to one side of its longitudinal median line being punched according to a permutation code for multi-column scan in a direction perpendicular to said median line, and at least the longitudinal margin portion to the other side of said median line being punched according to a permutation code for multi-row scan in a direction parallel to said median line; the last named margin portion including a row of feed holes lying inward of the card edge and between the rows of margin punchings.

2. A composite code punched card of rectangular shape, the area to one side of its longitudinal median line being marked according to a permutation code for multi-column scan in a direction perpendicular to said median line, and the longitudinal margin portion to the other side of said median line being marked according to a different code for multi-row scan in a direction parallel to said median line; the last named margin portion including a row of feed holes lying inward of the card edge and between the rows of margin punchings.

References Cited in the file of this patent

UNITED STATES PATENTS 2,189,046 Smith et al. ............ Feb. 6, 1940
2,274,071 Kelley ............ Feb. 24, 1942